United States Patent
Winzer et al.

[15] 3,654,025
[45] Apr. 4, 1972

[54] CAMBERING DRUM

[72] Inventors: Wolfgang Winzer, Jork; Reinhard Piotrowski, Hamburg, both of Germany

[73] Assignee: Fried. Krupp Gesellschaft mit beschrankter Haftung, Essen, Germany

[22] Filed: Feb. 9, 1970

[21] Appl. No.: 9,557

[30] Foreign Application Priority Data

Feb. 7, 1969 Germany ................... P 19 06 023.2
Jan. 20, 1970 Germany ................... P 20 02 294.0

[52] U.S. Cl. .................. 156/415, 18/2 TE, 156/417
[51] Int. Cl. ............................................. B29h 17/26
[58] Field of Search .............. 18/2 TE, 45 RR; 144/288 A; 254/50.1, 50.2, 50.3, 50.4, DIG. 10; 156/394, 414, 415, 416, 417, 418, 419, 420

[56] References Cited

UNITED STATES PATENTS

| | | |
|---|---|---|
| 3,342,663 | 9/1967 | Pouilloux ..................... 156/416 |
| 1,479,005 | 1/1924 | Pearson ..................... 156/417 X |
| 1,754,273 | 4/1930 | Karbowski et al. .................. 156/417 |
| 2,655,977 | 10/1953 | Hodkins ..................... 156/415 X |
| 3,485,692 | 12/1969 | Frazier ..................... 156/416 X |

FOREIGN PATENTS OR APPLICATIONS

1,113,622  5/1968  Great Britain ........................ 156/416

*Primary Examiner*—Samuel W. Engle
*Assistant Examiner*—Stephen C. Bentley
*Attorney*—Karl F. Ross

[57] ABSTRACT

A drum for the cambering of belt-tire carcasses in which sets of toroid segments are displaced radially outwardly nonuniformly to form a cambering shell upon which the tire carcass is deformed by the axial movement of a pair of actuating members coupled by lever linkages with the segments. The shell is flanked by a pair of lateral disks for centering the tire carcasses and coupled with the axially shiftable members.

14 Claims, 9 Drawing Figures

Patented April 4, 1972

INVENTORS,
WOLFGANG WINZER
BY R. PIOTROWSKI

Karl F. Ross

ATTORNEY

Patented April 4, 1972

INVENTORS,
WOLFGANG WINZER
BY R. PIOTROWSKI
Karl F. Ross
ATTORNEY

CAMBERING DRUM

1. FIELD OF THE INVENTION

Our present invention relates to a belt-tire cambering apparatus of the type in which a drum is expandable outwardly to impart an outward bulge or U-shaped profile to a tire.

2. BACKGROUND OF THE INVENTION

In the processing of belt tires, i.e., tires used on belt-guide wheels, so-called "carcasses" consisting essentially of a cylindrical body of rubber and fabric and provided with beads at the ends of the cylinder, is gripped at the cylinder ends and the central portion pressed outwardly or cambered to deform the carcass into a predetermined U-shaped profile, the outer portion of which may be milled or chased or otherwise treated. Cambering apparatus for this purpose, frequently referred to as a "bombieren-trommel" drum, have hitherto been provided with a pair of end disks spanned by an inflatable bladder or membrane which is inflated by compressed air after the tire carcass is set thereon. The central portion of the carcass is thereby deflected outwardly to impart a U-profile of the desired degree to the carcass structure the latter being held in place for the cambering operations along the outwardly bulging portions of the tire. Such operations may include the chasing of the periphery of the carcass by conventional techniques and/or the build-up of a layer thereon. The operations apply an inward pressure upon the carcass which cannot adequately be withstood by the inflatable bladder which serves to deflect the central portion of the carcass outwardly. As a consequence, the pressure rolls bearing inwardly upon the carcass tend to deflect the carcass irregularly and produce irregular products even though the internal pressure of the compressed air may be quite considerable.

OBJECTS OF THE INVENTION

It is the principal object of the present invention to provide an improved cambering drum, for a belt-tire cambering machine wherein the aforementioned disadvantages can be obviated.

It is a further object of our invention to provide an apparatus of the class described which will deflect the carcass of a tire or like member into a U-shaped profile uniformly throughout the circumference of the tire and yet be capable of resisting inward pressures during the cambering processes.

Still further, it is an object of our invention to provide a cambering drum and apparatus for operating same which is capable of deflecting portions of a generally cylindrical tire carcass radially outwardly to provide a uniform U-shaped profile thereof and to support the carcass against inward pressures resulting from the pressure rollers of the cambering machine.

SUMMARY OF THE INVENTION

These objects and others which will become apparent hereinafter are attained, in accordance with our invention, with a cambering drum having a pair of coaxial confronting disks engageable with the beads or ends of the tire carcass and axially shiftable toward and away from one another to clamp the carcass between them and deflect the end beads as inwardly as the central portion of the carcass between the end beads is pushed outwardly; between these disks, we provide a plurality of angularly equispaced outer generally toroidal segments and a plurality of angularly equispaced inner generally toroidal segments which are interleaved with the outer segments or alternate therewith the segments constituting a substantially continuous toroidal drum lying outwardly of the carcass-engaging surfaces of the end disks in the closed condition of the apparatus such that the alternating segments practically are contiguous along the inner surface of the carcass and constitute a rigid support therefor against inward pressure.

The inner and outer segments are coupled, according to this invention, with the end-closing disks and move outwardly as the disks are approached toward one another so that the outer segments are spread apart to receive the inner segments which fit into the space between the outer segments. The terms "inner" and "outer" are used herein to designate the sets of segments which are spread nonuniformly and reach the shell periphery last and first, respectively, and are not to be considered as establishing the relative orientation of the segments in the retracted condition of the drum. In the latter condition, all of the segments are located at approximately the same radial distance from the axis of the device. Of course, more than two sets of alternating segments may be provided.

It will be apparent that the tire-cambering drum of this invention is provided with segments which, in their outer positions, conform to the desired inner configuration of the tire carcass in the outwardly bulging condition of the latter and so arranged as to enable one of the sets of alternating segments to be withdrawn inwardly to a greater extent than another set of such segments whereby the circumference of the arrays of segments in the retracted positions thereof may be less than the circumference of the carcass to enable the latter to be conveniently placed upon the drum. The retracted segments thus lie within the outlines of the lateral disks.

According to a feature of this invention, the drives for these segments are so constructed and arranged as to enable the inner set of segments to move radially outwardly at a faster rate than the outer set of segments so that all of the segments are brought into their outermost "closed" position substantially simultaneously. The same result can be achieved by providing a lost motion between the sets of segments.

According to another feature of this invention, the segments of one set are rigid (e.g. formed in one piece) whereas the segments of the other set are flexible in the sense that are brought into a fixed configuration only with their introduction between the segments of the fixed set, the term "flexible" being used here to refer to the construction of the segments in two or more hingedly interconnected parts which are swung outwardly in the inner positions, but are swung inwardly when brought into the gaps between the rigid or nonflexible segments. This construction has been found to be highly advantageous in that it decreases the radial movement of the segments and permits a tight fit of the alternating segments around the periphery of the drum. The radial movement of the segments and simultaneous axial displacement of the disks is effected by toggle or scissor linkages, bellcrank levers or the like.

For the movement of the lever linkages, according to the present invention, we provide on opposite sides of the transverse median plane of the drum, a hollow-shaft having a pair of opposing outer threads of a similar pitch configuration in which rollers (cam-follower rollers) of respective linkages are received to effect axial displacement of the disks with relative rotation of the sleeves and the hollow-shaft. The rollers may have radial axes and are mounted on the sleeves which are fixed angularly with respect to the disks and coupled by the lever linkages with the segments. The entire assembly is carried by the drive shaft by which the entire drum is rotated so that the adjustment mechanism for the segments and the drive for rotation of the drum are independent of one another.

According to the present invention, the means for radially displacing the segments includes the sleeve or sleeves mentioned earlier which are provided with a drive member on a rotatable hollow shaft upon which an outer thread of trapezoidal cross section is formed. Relative rotation of the sleeves, which carry the cam-follower rollers and the threaded shaft, the latter functioning as a cam, axially displaces the sleeves toward and away from one another and, via the aforementioned lever linkages, displaces the segments outwardly and inwardly to spread and retract the shell. For the drive (rotation) of the entire drum (when the carcass is in place and properly cambered) we provide a clutch or other coupling between the hollow shaft and the drum shaft.

The pitch of the thread sections may be nonuniform throughout the axial length or separate threads may be provided for the inner and outer segments via respective cam followers to enable the displacement of the segments at different rates. For example, the displacement of the outer segments or the acceleration thereof radially outwardly into their end positions may be effected at a substantially slower rate than the displacement of the inner segments whereby both may reach their end positions simultaneously as previously noted. In this case, the different pitches of the threads or portions thereof enables the different rates of displacement required for this purpose. Conversely, radial displacement of the inner segments inwardly at a higher rate than the outer segments, when the carcass is to be withdrawn from the drum, enables the outer segments to form a crown around the inner segments and to be withdrawn inwardly to a greater extent than would otherwise be possible. As a consequence, the outer diameter of the drum, defined by the array of the outer segments, can be much smaller than the inner diameter of the carcass to permit the latter to be placed upon or withdrawn from the drum with ease.

To enable the outer limiting or end positions of the segments to be identical and reproducible from one operation to the next, thereby defining a reproducible cambering-shell, there is provided stop means on the hollow shaft and/or the drum shaft for limiting the axial displacement of the sleeves and/or the radial displacement of the segments as they move outwardly. Preferably a bore can be provided in an end face of the hollow shaft while a detent pin is provided on the drum shaft for an indexing engagement with the bore when the relative angular displacement of the drum shaft and the hollow shaft corresponds to the limiting positions of the segments desired in the expanded condition of the drum. Additionally, the segments may be provided in the expanded position with fingers, ledges or lugs which engage recesses in the end disks in the extreme outward positions of the segments.

According to a further feature of this invention, the segments are of axially adjustable width, i.e. can be spread or contracted in the direction of the axes of the hollow shaft to accommodate tire carcasses of different width when, for example, a number of different widths of tires are to be cambered. Moreover, good control of the movable parts of the system, i.e. movement of the parts with highly limited play is achieved when the segments of both arrays or groups are further sectioned and coupled in pairs, each member of the pair being proximal to and associated with one of the lateral disks flanking the segments. The members of each pair are axially slidable relative to one another but are provided upon their mutually facing portions with interleaved formations, fingers or teeth defining comb-like couplings.

Still another feature of our invention resides in the provision of axially movable piston rods respectively associated with the lateral disks flanking the drum and coaxially surrounding the drum shaft. A single angular piston may likewise coaxially surround the drum shaft and be coupled with the angularly equispaced piston rods, the piston being slidable in a double-acting annular cylinder displaced by a fluid medium, e.g. compressed air or hydraulic fluid. In this case, the relative movement between the disks and the segments may be independent and can be separately controlled. Furthermore one piston may control both sets of segments or each piston may control a respective group of the segments while a screw arrangement controls the disks. The best result are obtained when the lateral disks carry the piston mechanisms. Fluid supply to the pistons may include ducts within the interior of the shaft of the drum and appropriate fluid-control means.

The displacement of the segments of one group at a faster or slower rate than the other can also be accomplished solely with the aid of control and linkage levers with different distances between the load pivots, the force-application pivots and the fulcrum pivots of the levers. Preferably, the levers are provided with suitably shaped guide slots cooperating with guide rolls on the piston rods to actuate the lever linkages at the desired rates or to the desired degrees. Pneumatic operation of the annular piston is preferred, with regulation of the fluid supply through the drum shaft being effected by means of slide valves.

To eliminate any residual unevenness along the outer periphery of the drum formed by the segments and to establish a uniform but narrow gap between the inner surface of the carcass and the outer surface of the segments, we provide an elastic bladder the sides of which are sealingly anchored to the lateral disks and which may be inflated in the operating position of the drum with compressed air supplied to the gap between the segments and the bladder, e.g. through the interior of the hollow shaft mentioned earlier. To ensure that the segments and their lever linkages will not have to take up the full restoring force of the elastic bladder during expansion of the drum, the bladder chamber, i.e. the space surrounded by the bladder is pressurized until the bladder is expanded approximately to its outermost condition before or during the spread of the segments outwardly. The final configuration of the carcass inner surface is then formed by the further spread of the segments outwardly until they lie against the inner surface of the bladder.

DESCRIPTION OF THE INVENTION

The above and other objects, features and advantages of the present invention will become more readily apparent from the following description, reference being made to the accompanying drawing in which.

SPECIFIC DESCRIPTION

Figure 1:
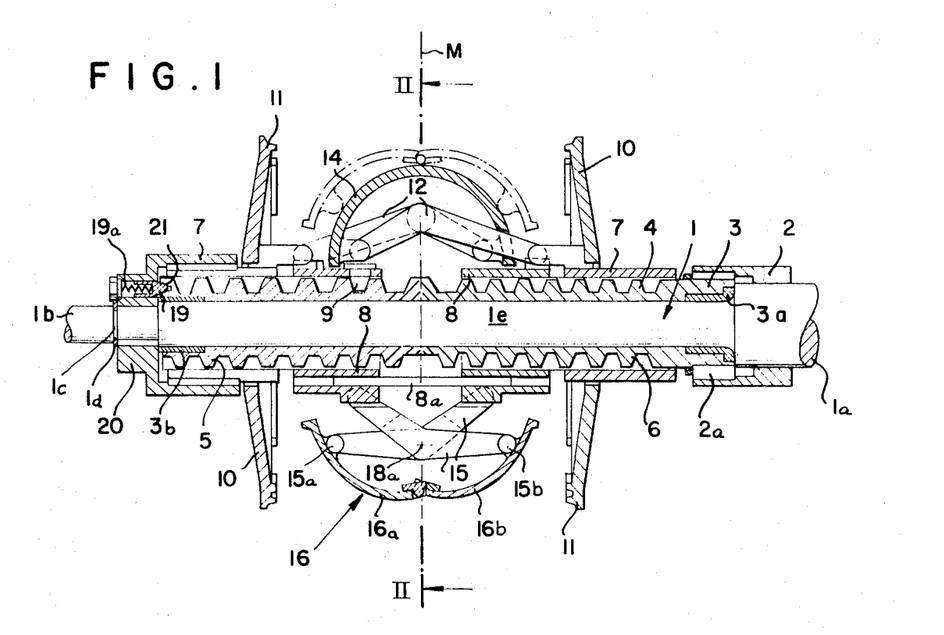
FIG. 1 is an axial cross-sectional view through a tire-cambering drum, according to the present invention, the apparatus being shown in its retracted position prior to the receipt of a tire carcass.
Figure 2:
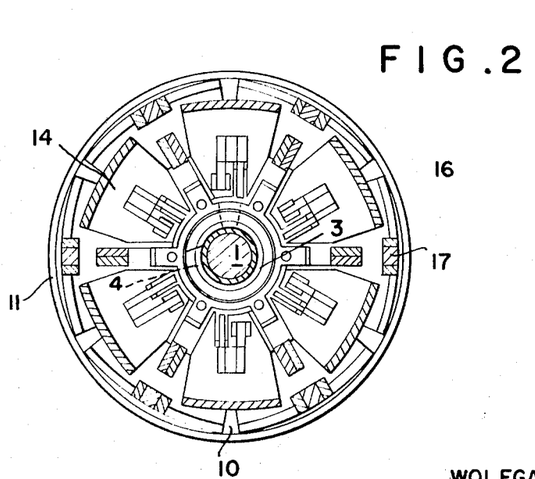
FIG. 2 is a cross-sectional view taken generally along the line II — II OF FIG. 1.

In FIGS. 1 – 4 of the drawing, we show a cambering drum for the processing of belt-tire carcasses which comprises a drum shaft 1 supported at a large-diameter portion 1a and having a narrow end 1b formed with a groove 1c adapted to receive a spring ring 1d for retaining the parts of the assembly against axial displacement outwardly from the position illustrated in FIG. 1.

Figure 3:
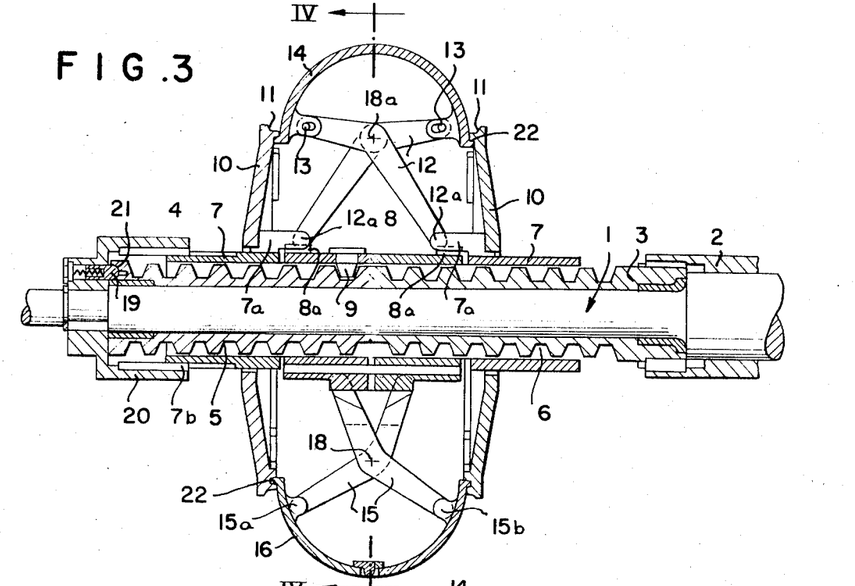
FIG. 3 is an axial cross-sectional view similar to that of FIG. 1 but showing the segments of the drum in their spread position.
Figure 4:
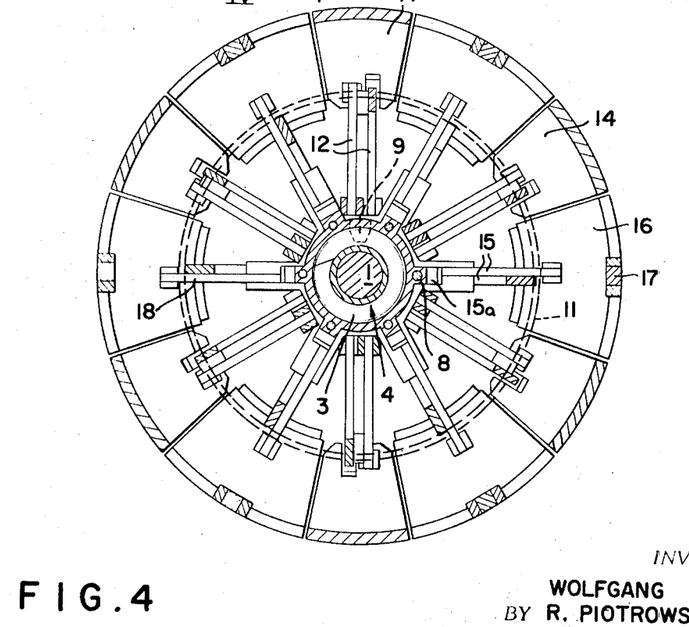
FIG. 4 is a cross-sectional view taken along the line IV — IV of FIG. 3.

A sleeve 2 is rotatable upon the large-diameter shaft portion 1a of the shaft 1 and is coaxial with the latter while being keyed at 2a to the hollow shaft 3 which coaxially surrounds the shaft 1 and is provided with bearing bushings 3a and 3b rotatably journaling the hollow shaft 3 on the shaft portion 1e of the drum shaft 1. Along this outer periphery the hollow shaft 3 is formed with an external thread 4 subdivided axially into a left-hand section 5 and a right-hand section 6, the thread having a trapezoidal cross section as shown in FIGS. 1 and 3. The threads of the two sections 5 and 6, are formed with identical pitches on opposite sides of the transverse median plane M through the assembly, but with opposite senses, i.e. one of the thread sections is constituted with the left-hand thread while the other is constituted with the right-hand thread.

Upon the hollow shaft 3, we provide a pair of outer sleeves 7 and a pair of inner sleeves 8 which are axially shiftable toward and away from one another and serve to actuate the segments forming the shell of the cambering drum. The sleeves 7 and 8 are also rotatable relative to one another, the sleeves 8 being coupled by rods 8a permitting relative axial displacement of these sleeves but preventing relative angular movement therebetween. The sleeves 7 and 8 are provided with cam-follower rollers 9 (FIGS. 1 and 3) having radial axes and apex angles corresponding to the angles of the flanks of the thread whereby rotation of the hollow shaft 3 relative to the sleeves 7 and 8 will result in axial displacement of the sleeves in one direction or the other.

A pair of lateral disks 10 is provided on the sleeves 7, the disks 10 being formed along their confronting faces with outwardly open centering recesses 11 engageable with the beads of the tire carcass for positioning the latter with respect to the chasing drum. The sleeves 7 are connected with scissor linkages 12, 13 of radially shiftable, one-piece members 14 conforming to the configuration of a toroid segment (see FIGS. 1 and 3). In FIG. 3, for example, it is seen that the sleeves 7 carrying inwardly protecting fingers 7a which overhang the sleeves 8 when the entire assembly is axially compacted and are prevented from moving angularly with respect to the sleeves 8 by upstanding ribs 8a flanking the fingers 7a. The bellcrank levers 12, which are paired and provided with a common fulcrum pivot at 18a for each pair, have their long arms pivoted at 12a to the fingers 7a and their short arms pivotally received in a slot 13 of a lost-motion junction. Consequently, axial movement of the sleeves 7 toward one another swings the segments 14 radially outwardly from the inner position illustrated in FIGS. 1 and 2 to the outer position illustrated in FIGS. 3 and 4.

The sleeves 8 are similarly connected by scissor or toggle levers 15 with the alternating segments 16, the later constituting the segments of the outer array in the spread condition of the assembly. The toroidal segments 16 of the chasing drum, moreover, are subdivided along the circumference of the drum into a pair of segment halves 16a, 16b hinged together at 18 for swinging movement between the position illustrated for the segment 16 located at the bottom of the drum in FIG. 1 to the position shown for the corresponding segment in FIG. 3. The levers 15 are connected at 15a and 15b with the parts 16a and 16b by pivot joints, both levers 15 of each pair being provided with a common fulcrum as represented at 18a. The sleeves 8, moreover, are formed with lugs defining pivots 15c with the levers 15 (see FIG. 4).

Coupled with left-hand sleeve 7, via a spline 7b we provide a clutch and indexing sleeve 20 held against axial movement by the ring 1d but carrying an indexing pin 19 loaded in the axial direction by a compression spring 19a seated against the plug 19b. The indexing pin 19 is engageable in a recess 21 formed in the end face of the hollow shaft 3. With the apparatus in the position illustrated in FIGS. 1 and 2, the unchased and generally cylindrical carcass is placed upon the chasing drum in the axial direction such that its lateral beads rest upon the sleeve 10, preferably fitting in the recesses 11 provided for centering the carcass relative to the chasing drum. To impart the outwardly bulging configuration to the carcass, we rotate the sleeve 2 of the hollow drum shaft 1. In this manner, the sleeves 7 and 8 are moved axially inwardly in the direction of the median plane M so that the greater pitch of the thread 5 or 6 engaged by the rollers 9 of the sleeve 7, enable these sleeves to move axially inwardly at a higher rate than the axial displacement of the inner sleeves 8 whose rollers 9 engage thread of smaller pitch. While the pitches of the sections 5 and 6 of the thread are identical one with the other, the pitch of each of these sections may vary between a small pitch outwardly of the median plane M and a large pitch in the region thereof. The segments 16 are thus moved outwardly more rapidly than the segments 14 reach their end positions followed by the segments 14 so that the segments 14 and 16 are spread inwardly without mutual interference. As noted in FIG. 4, the segments 14 and 16 alternate with one another and form a substantially contiguous toroidal contour, thereby applying a similar camber to the carcass. When the segments reach their outermost positions, the indexing pin 19 is received in a bore 21, thereby insuring reproducibility of the outer positions of the segments. The cambering of the carcass and finishing of the belt-tire body is completed with the segments 14, 16 supporting the carcass against the inward pressure, whereupon the rotating drum is stopped, the hollow shaft 3 and the drum shaft 1 rotate in the opposite sense relatively to axially shift the sleeves 7 and 8 outwardly, thereby retracting the segments 14 and 16 to permit the withdrawal of the cambered tire. In the takeup position, to which the apparatus is returned, the indexing means 19, 21 again registers.

In FIGS. 5 – 9, we show a cambering apparatus in which the drum shaft 23 is provided within a hollow shaft 24 for the drive of the cambering drum. An axially shiftable jaw clutch 25 allows connection of the shaft 24 with the right-hand assembly 26, the left-hand assembly of the system being represented at 27.

As will be apparent from FIGS. 5, 6 and 8, the assemblies 26 and 27 comprise a pair of lateral disks 26a and 27a, respectively, formed as outwardly extending flanges on an annular cylinder 26b, 27b which will be described in greater detail hereinafter. The assemblies 26 and 27 on opposite sides of the median plane M' of the drum are rotatable and axially shiftable on the shaft 23 and are connected together for joint rotation but relative axial movement by the respective pairs of bodies of the clutch sleeves 44.

The reciprocal or inverse movement of the assemblies 26 and 27 is effected by a pair of threads 28 and 29 on the shaft 23, the threads being of opposite sense and being received in nuts 36a, 36b of the respective assemblies. Rotation of the shaft 23 while the other shaft 24 is held stationary thus serves to advance the assemblies 26 and 27 toward one another or retract them axially from one another as will be apparent hereinafter.

Each of the assemblies 26 and 27 is formed, outwardly of the drum segments and the median plane M', with a respective double-acting fluid-responsive working chamber 30a, 30b in which respective annular pistons 31a and 31b are axially slidable. These pistons 31 are each provided with a plurality of angularly equispaced connecting rods 32a and 32b, coupled with linkage lever 33 for displacing the toroid segments as will be apparent hereinafter.

Each of the assemblies 26 and 27, moreover, is provided with a hub 35 formed with a chamber (e.g. 35a) communicating with the interior of the shaft 23 through which compressed air is supplied to operate the pistons 31a and 31b. The air passages through the shaft 23 are represented by dot-dash lines 23a and communicate with the chambers 35a which, via radial port 35b open into the working chambers 30a and 30b of the pneumatic cylinders.

Figure 5:
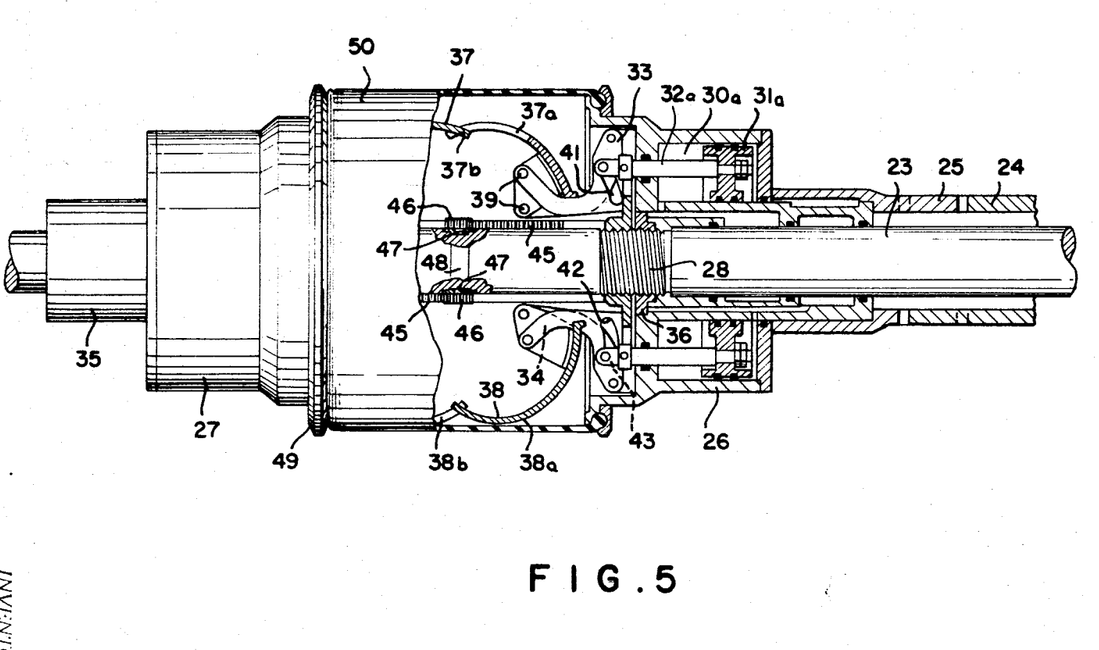
FIG. 5 is an axial cross-sectional view through a fluid-operated apparatus in accordance with the present invention.
Figure 8:
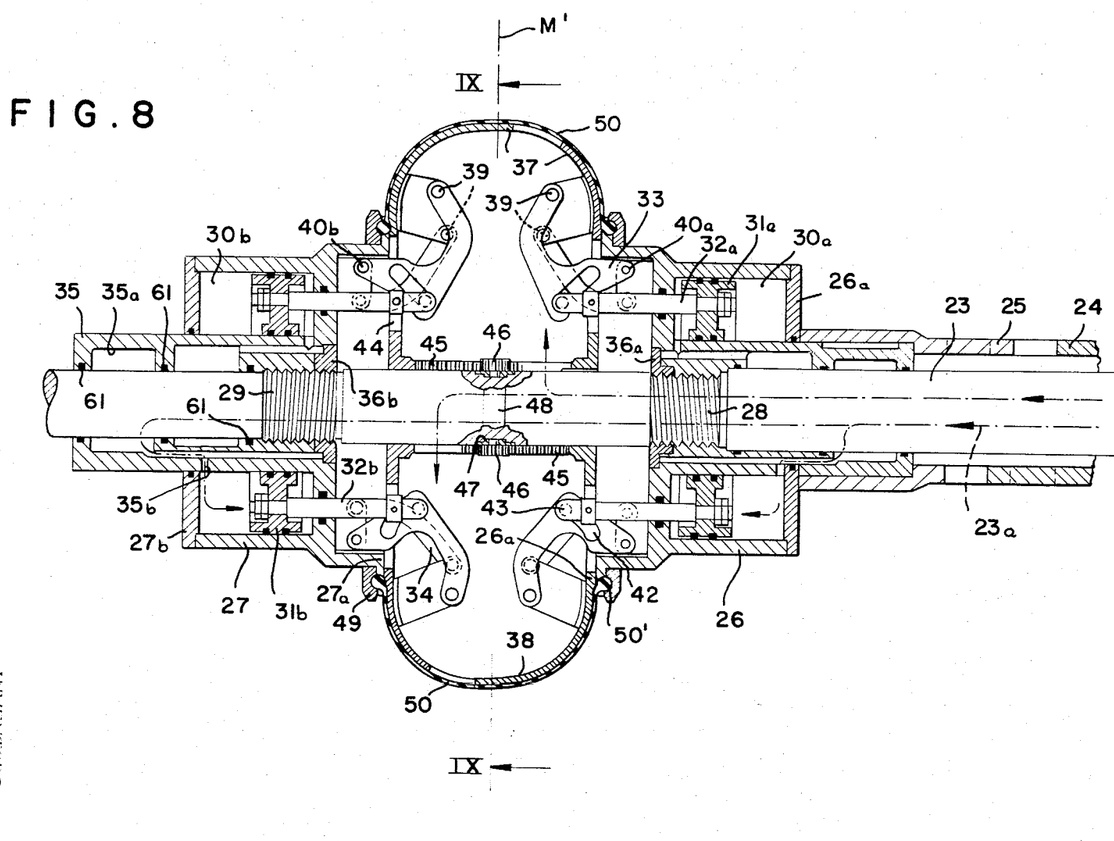
FIG. 8 is an axial cross-sectional view of the assembly in the fully spread condition of the drum.
Figure 9:
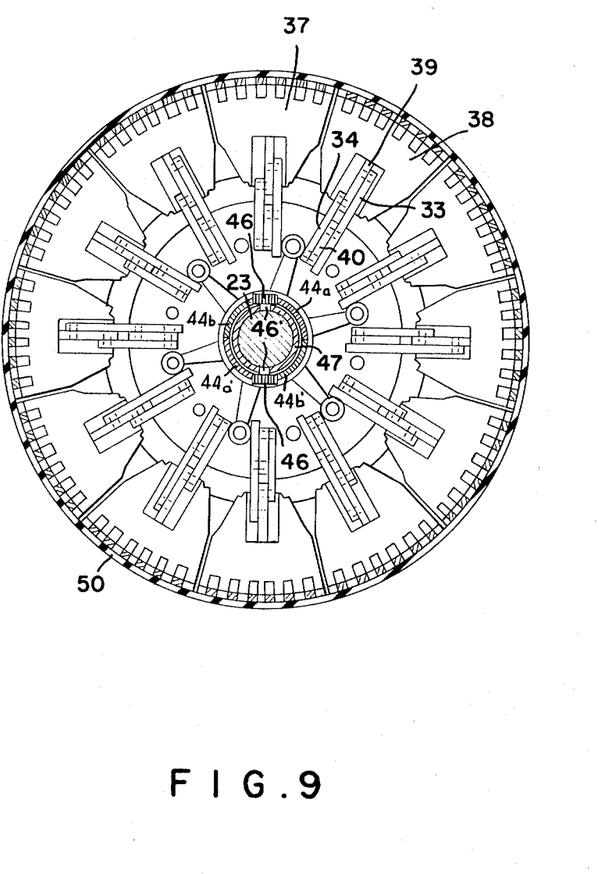
FIG. 9 is a cross-sectional view taken generally along the line IX — IX of FIG. 8.

The assemblies 26 and 27 are also formed with linkage supports 40 for the control and linkage levers 33 and 34 best seen in FIGS. 5 and 8. The segments 37 and 38 are joined by pivots 39 to the levers 33 and 34, the levers 33 being formed with guide slots 41 and 42 in which the camming rollers 43 of the pistons rods 32 are received. The slots are designed to pivot the levers 33 and 34 about fulcra 40a upon the support 40. The slots 41 and 42 are so dimensioned as to enable one set of segments to swing at a faster rate than the other or to enable one set of segments to be brought into the outermost position prior to the fitting of the other set between them.

The piston rods 32 also carry the star-shaped clutch sleeves 44 which are displaced during the stroke of the annular pistons. The diametrically opposite axially extending tongs 44a, 44a' and 44b, 44b' of the clutch members 44 axially interfit in a comb-like configuration and extend arcuately over approximately one quadrant each of the shaft 23. The mutually confronting edges 44c and 44d of the tongs of the two clutch members are toothed and engage toothed wheels or gears 46 in rack-and pinion configuration so that axial displacement of either of the sleeves 44 results in a reciprocal axial displacement of the other. The toothed wheels 46 are journaled by bearings 46' in a split ring 47 constituting a planet carrier for the pinion gears and rotatable in a circumferential groove 48 of the shaft 23. The ring 47 is thus axially fixed but rotatable about the shaft 23 while the shaft 23 is rotatable independently of the axial displacement of the lateral-disk assemblies 26 and 27.

Along their outer peripheries, the disk assemblies 26 and 27 are provided with bladder-clamping rings 49 which engage the beads 50' of a bladder 50 and clamp the latter in a sealed fashion whereby inflation of the space 50'' within the bladder is possible via gaps 44' between the tongs 44a, 44a', etc. The members 49 also constitute centering rings for the beads of the tire carcass to be mounted upon the drum. Seals 60 surrounding the rods 32a etc. and seals 61 between the assemblies 26 and 27 and the shaft 23 prevent the escape of gases from the chamber 50''.

Figure 6:
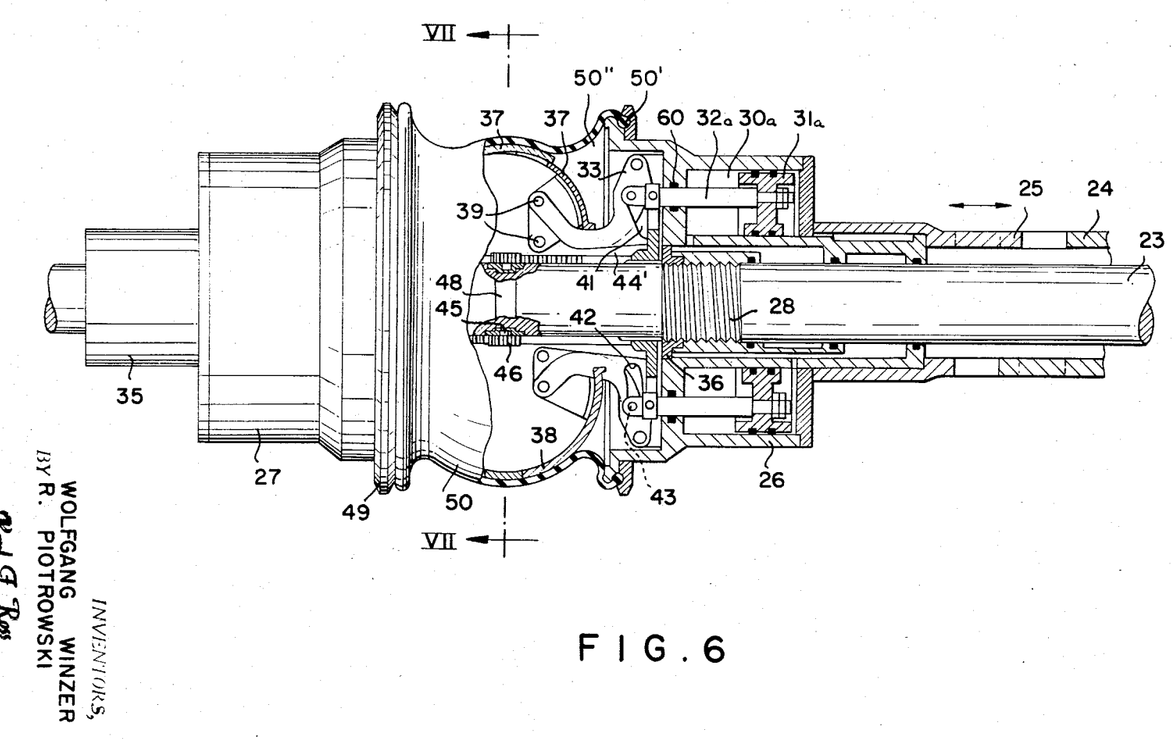
FIG. 6 is an axial cross-sectional view generally along system of FIG. 5 showing the position of the various parts upon gripping of a tire carcass.
Figure 7:
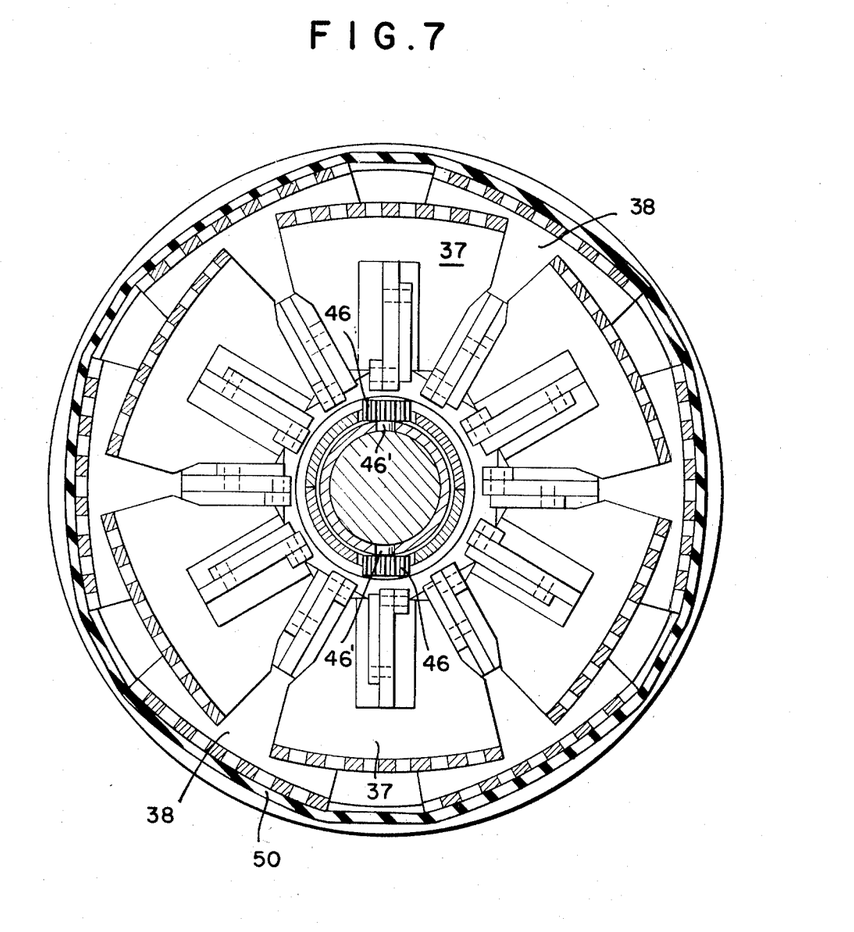
FIG. 7 is a cross-sectional view taken generally along the line VII — VII.

The segments 37 and 38 are subdivided axially in the transverse median plane M' of the assembly into two members as best seen in FIG. 5, the members interengaging via interleaved teeth 37a and 37b or 38a, 38b which permit radial spreading as well as axial spreading from the position illustrated in FIG. 6 to the position shown in FIG. 5. In the expanded state, however, the segments 37 and 38 define an approximately closed surface, the pivot 39 constituting a precision linkage having substantially no play. The linkage 37 is detachable to enable replacement of the segments 37 and 38. When, for example, belt tires of different dimensions are to be cambered. With the drum in the position illustrated in FIG. 5, the generally cylindrical belt tire carcass is placed upon the drum and air is introduced into the interior of the bladder 50 while the drum shaft 23 is rotated and the hollow shaft 24 held fixed to produce an axial movement of the bodies 26 and 27 toward one another via the screw 28. The position illustrated in FIG. 6 is then attained. The pistons 31a, 31b are then pneumatically displaced synchronously toward one another (FIGS. 8 and 9) to swing the segments radially outwardly into the cambering position while the bladder 50 is inflated to prevent stressing of the lever linkages. The clutch 25 is then actuated to drive the drum with the shaft 23 rotating together therewith. When the tire blank has been processed, the segments 37 and 38 are swung inwardly while the bladder 50 is deflated and finally placed under suction (FIG. 6) to release the tire. The bodies 26 and 27 are thereafter axially spread apart by the screw arrangement to permit the next working cycle.

The improvement described and illustrated is believed to admit of many midifications within the ability of persons skilled in the art, all such modifications being considered within the spirit and scope of the invention except as limited by the appended claims.

We claim:

1. An apparatus for the cambering of belt-drive carcasses comprising:
    a pair of axially shiftable confronting lateral disks rotatable about an axis;
    two sets of interfittable toroid segments movably mounted between said disks and having a spread position wherein said segments form an outwardly bulging cambering shell and a retracted position wherein said segments are withdrawn inwardly within the outlines of said disks;
    actuating means for displacing said sets of segments unequally whereby the segments of one set are spread apart to receive the segments of the other set between them in the spaced position of said segments;
    a drum-support shaft carrying said disks and said segments, said segments and said disks together defining a cambering drum, said sets of segments and said disks being coaxial with said shaft, the segments of said sets alternating around said shaft, said actuating means including at least two mechanisms on said shaft axially shiftable relatively thereto and to one another, and
    linkage means interconnecting each of said mechanisms with the segments of a respective one of said sets for force transmission between said segments and said mechanisms whereby said mechanisms displace the segments of said sets, the segments of one of said sets being constituted each in one piece while the segments of the other of said sets are subdivided and linked together for spreading and contracting movement upon displacement of said segments.

2. The apparatus defined in claim 1, further comprising an inflatable bladder surrounding said shell and supportable by said shell against said carcasses, said bladder spanning said disks.

3. The apparatus defined in claim 1 wherein the linkage means coupling the respective mechanism to the segments of said other of said sets includes a pair of levers forming a scissor linkage and is respectively connected to the parts of the subdivided segments.

4. The apparatus defined in claim 3 wherein the mechanism connected to said scissor linkage includes a respective sleeve mounted on said shaft and pivotally connected each to a respective lever of said scissor linkage, and a hollow shaft between the first-mentioned shaft and said sleeves and provided with an external thread subdivided axially into a pair of thread sections with the threads thereof turning in opposite senses, said sleeves each including a roller engaging said threads.

5. The apparatus defined in claim 4 wherein said hollow shaft and at least one of said sleeves is provided with detent means for indexing said sleeves and said hollow shaft angularly in selected relative positions of said hollow shaft and said sleeves corresponding to limiting positions of said segments.

6. The apparatus defined in claim 4 wherein the other of said mechanisms includes a pair of sleeves having rollers engaging said thread sections, the pitches of said thread sections varying therealong whereby relative angular displacement of said sleeves and said hollow shaft axially displaces the sleeves of said one set and the sleeves of said other set of segments at different rates.

7. An apparatus for the cambering of belt-tire carcasses comprising:
    a pair of axially shiftable confronting lateral disks rotatable about an axis;
    two sets of interfittable toroid segments movably mounted between said disks and having a spread position wherein said segments form an outwardly bulging cambering shell and a retracted position wherein said segments are withdrawn inwardly within the outlines of said disks;
    actuating means for displacing said sets of segments unequally whereby the segments of one set are spread apart to receive the segments of the other set between them in the spread position of said segments;
    a drum-support shaft carrying said disks and said segments, said segments and said disks together defining a cambering drum, said sets of segments and said disks being coaxial with said shaft, the segments of said sets alternating around said shaft, said actuating means including at least two mechanisms on said shaft axially shiftable relatively thereto and to one another; and
    linkage means interconnecting each of said mechanisms with the segments of a respective one of said sets for force transmission between said segments and said mechanisms whereby said mechanisms displace the segments of said sets, said mechanisms include a pair of fluid-responsive members each connected with one of said disks and operatively connected to one of the segment halves of each of said pairs, said disks being each formed with a respective annular fluid cylinder surrounding said shaft, said members being provided as annular pistons received in said cylinder and axially reciprocable therein while having piston rods connected with said segments.

8. The apparatus defined in claim 7 wherein said segments are of adjustable width in the axial direction.

9. The apparatus defined in claim 7, wherein said linkage means includes respective levers connecting said piston rods with said segments, said levers being formed with slots and said piston rods being formed with guide rolls received in said slots, said slots being dimensioned to enable the segments of said sets to move unequally.

10. The apparatus defined in claim 9, further comprising means for axially displacing said disks reciprocally independently of said cylinders.

11. The apparatus defined in claim 10 wherein the last-mentioned means includes a hollow shaft mounted on the first-mentioned shaft for rotating said disks relative to said first shaft, said first shaft and said disks being formed with reciprocally threaded portions operable upon relative angular displacement of said disks and said first shaft to displace said disks together and draw said disks apart.

12. The apparatus defined in claim 11 wherein at least some of said segments are axially subdivided about a transverse median plane between said disks into respective halves of segment halves having interfitting comblike formations between them.

13. The apparatus defined in claim 7, further comprising rack-and-pinion means between said mechanism for enabling reciprocal axial displacement thereof while permitting said mechanisms to rotate relatively to said shaft.

14. The apparatus defined in claim 7, further comprising an inflatable bladder surrounding said shell and supportable by said shell against said carcasses, said bladder spanning said disks.

\* \* \* \* \*